Sept. 28, 1965     W. L. BLISS     3,208,491
BALE SHREDDING APPARATUS
Filed June 13, 1962     3 Sheets-Sheet 1

INVENTOR.
WILLIAM L. BLISS
BY
ATTORNEY

Sept. 28, 1965   W. L. BLISS   3,208,491
BALE SHREDDING APPARATUS
Filed June 13, 1962   3 Sheets-Sheet 2

INVENTOR.
WILLIAM L. BLISS
BY
ATTORNEY

Sept. 28, 1965 W. L. BLISS 3,208,491
BALE SHREDDING APPARATUS
Filed June 13, 1962 3 Sheets-Sheet 3

INVENTOR.
WILLIAM L. BLISS
BY
ATTORNEY

United States Patent Office 3,208,491
Patented Sept. 28, 1965

3,208,491
BALE SHREDDING APPARATUS
William L. Bliss, Rte. 1, Box 77, Newkirk, Okla.
Filed June 13, 1962, Ser. No. 202,328
7 Claims. (Cl. 146—70.1)

This invention relates in general to hay shredding devices, and in particular to improvements in the shredding mechanism and feed mechanism of a rotary blade-type shredding machine.

In order to manufacture feed pellets in a commercial feed mill, hay must be pulverized into small lengths so that it can be processed properly and mixed with feed. After the hay is pulverized into small bits, the hay is mixed with other ingredients and the mixture is then applied to a pelletizing machine.

The pulverizing of the hay can be accomplished by using one of two generally accepted methods. The first comprises placing the hay in one of two hammer mills where the hay is pulverized to a fairly coarse consistency where it is then fed into a second hammer mill and further pulverized to a very fine consistency, the size of which is acceptable for the pelletizing machines. The second method comprises taking a shredding machine and breaking the hay into fairly small pieces and then feeding the resultant mixture into a hammer mill where it is subsequently pulverized to a size sufficient for the pelletizing machine. The hay shredding operation is much more economical since the machine not only can pulverize a much larger quantity of hay during a given time, but also can shred the hay to a fine consistency using very much less horsepower than the hammer mill. For example, the hammer mill usually requires 100 horsepower per mill, while the average shredding machine generally requires less than one-fourth this much horsepower.

The shredding machines, in their present state of development, however, suffer from several defects, for example, they will not accept a high rate of feed without jamming the blades; further they have no method of controlling the feed rate of the machine. At times the mill will be fed too rapidly and at times not rapidly enough causing the machines to operate inefficiently and causing the blades to jam from too heavy a feed. The machines further require an excesive amount of horsepower in order to break the hay into a size satisfactory for the hammer mill. Further, hay shredding machines that are designed for square bales will not work on round bales and vice verse.

It is therefore an object of this invention to reduce the amount of horsepower required to shred a bale of hay at a high feed rate.

It is a further object of this invention to prevent jamming or sticking of the blades caused by an excessive feed rate.

It is a still further object of this invention to prevent jamming of the blades caused by unshredded material rotating around the blade and piling up against the stationary shear blades in the machine.

It is another object of this invention to increase the cutting efficiency of the blades.

It is a still further object of this invention to provide a second shearing blade that cannot become jammed during normal operation of the machine.

A further object of the invention is to adapt the machine for portable use including a method for reducing the width of the machine thereby providing a shredder capable of being pulled along a highway or other type road without obstructing traffic.

It is also an important object of this invention to devise a method for disengaging the feeding conveyor while permitting the blade and emptying conveyor to operate thereby permitting the machine to be cleared without removing the bales of hay that have been placed upon conveyor.

This invention features a shredding mill having a housing with an opening in one side. A hay conveyor is mounted so that hay can be moved into the opening in the side of the shredder. Mounted horizontially across the opening is a rotating shredder blade. In order to control the feed of the hay through the opening and into the blade, a spring biased feeding means is mounted across the opening in front of the rotating blade. The feeding means comprises the plurality of obliquely bent bars mounted at one end to a horizontal shaft which is spring biased such that the hay when striking the oblique bars will cause an increase in pressure such that as the hay is fed into the machine, a force is exerted attempting to prevent the hay from feeding excessively fast toward the rotating blades. The closer the hay approaches toward the blades, the greater is the force against the hay.

A second feature of this invention is a method for preventing jamming of the blades. Jamming between the rotating and stationary blades is eliminated by substituting the stationary shear blade with a rotating shear blade mounted in front of the conveyor. Any tendency to jam is eliminated since the jammed material tends to free itself as the blade rotates. Jamming of the rotating blade is eliminated by mounting a second set of blades in back of and in between each of the shear shredder blades. Any hay which has a tendency to be caught in the teeth of the shredder blade and carried around the shredder blade strikes the second set of blades further breaking the hay, permitting it to fall down into the bottom of the shredding machine. Jamming of the rotating blade by hay which tends to be too tightly compacted for proper shredding of the shredder blades is eliminated by mounting a third set of blades between each of the main shredding blades. These blades further chop tightly compressed hay thereby completing the shredding operation. This set of blades (mounted between the main shredder blades) is the novel feature that permits shredding round bales of hay.

In order to further reduce the horsepower needed to shread the hay, each of the shredded blades is plated with nickel. The nickel has a tendency to slice through the hay without causing an increased friction or drag on the machine. The nickel plating results in a drastic reduction in the amount of horsepower needed for the shredding operation.

In order to cause the hay shredder to be as compact as possible during transportation from one point to another, the supporting structure of the hay feeding conveyor is journaled about the front driveshaft of the conveyor. A hoist is mounted on the main housing and connects to the supporting structure of the feeder conveyor. The hoist is then used to lift the feeder conveyor which pivots about the conveyor driveshaft, substantially perpendicular with the side of the shredder housing thereby reducing the overall width of the shredder to a minimum amount. This reduction in width permits the shredder to be moved easily from one point to another, further, greatly improves its lateral stability since the majority of the weight of the feeder conveyor is now substantially vertical rather than horizontal.

Other objects and features of this invention will become apparent when reference is made to the specification and accompanying drawings, in which.

Common numbers will be used throughout the specification where possible for common parts.

Figure 1:
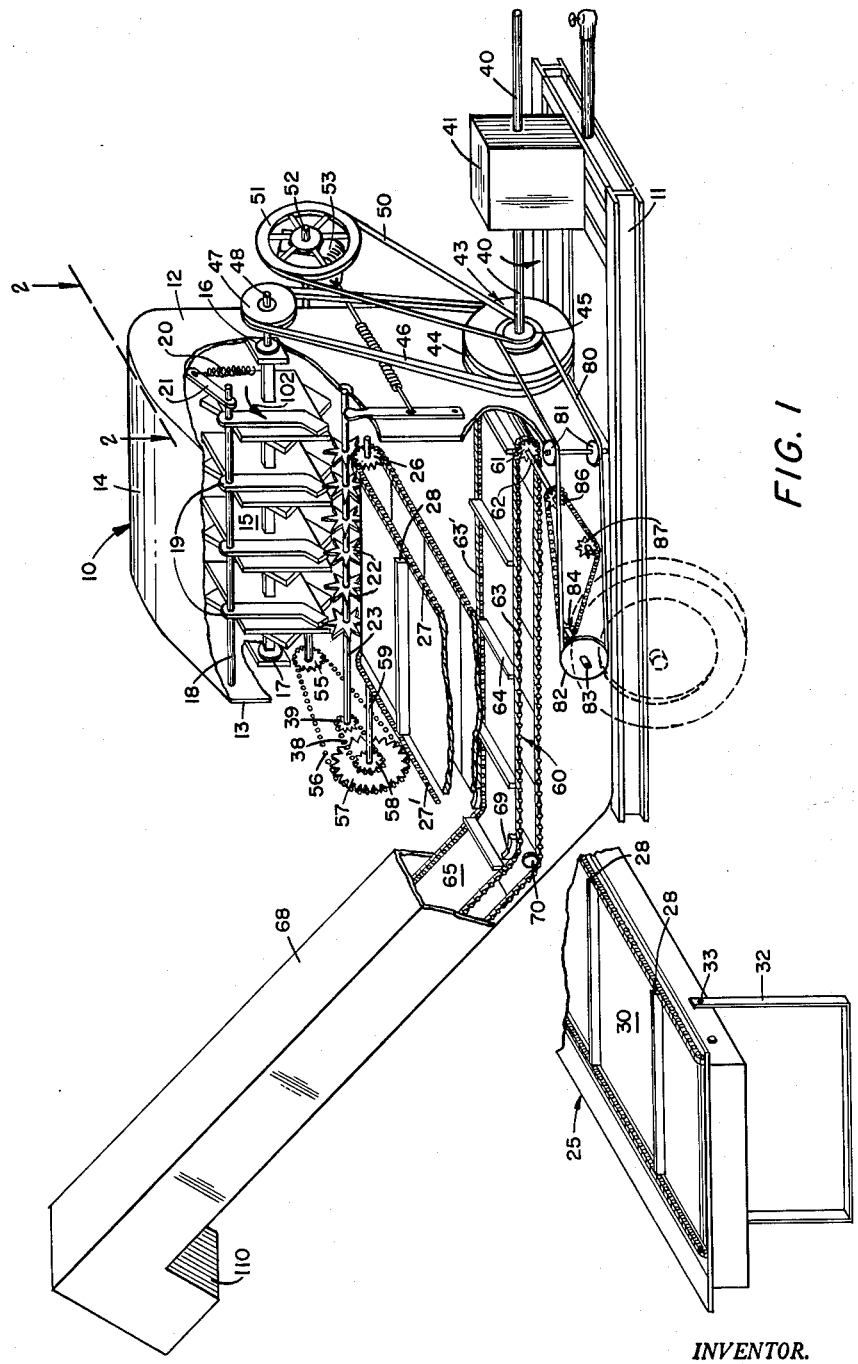
FIGURE 1 is a three-dimensional view of the portable hay shredding machine wherein part of the housing and conveyor have been cut away in order to show more clearly the operating mechanism of the shredder.
Figure 3:
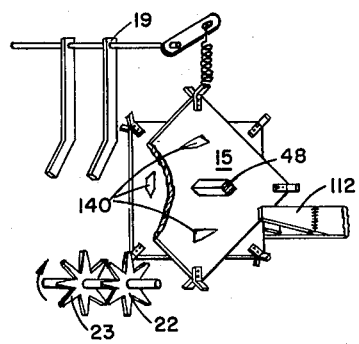
FIGURE 3 shows a portion of the main shredding blade, the rotating shearing blade, the stationary shearing blades and the feed control mechanism.

Referring to the drawings and in particular to FIGURES 1 and 3, a portable bale shredding machine is shown wherein a housing 10 is shown mounted on a trailer-type framework 11 which may be constructed of angle bars or any other suitable base for the shredder, for example, aluminum which is welded or bolted, or wood could be suitably used if desired. A hitch 9 is attached to frame 11 and providing means for coupling the shredder to a tractor or other vehicle. Housing 10 comprises a pair of sides 12 and 13 and a top 14. A main shredding blade 15 is horizontally mounted between sides 12 and 13 by a pair of bushings 16 and 17. The feed control mechanism for the shredder comprises a horizontal shaft 18 journaled in the sides 13 and 12 in front of the open side of the shredding machine. Rigidly attached to the shaft 18 is a plurality of feed bars 19 which are depending from said bar and angled away from the rotating blade at a point intermediate between the shaft 18 and the end of the bars 19. A spring biasing means 20 is connected through a lever 21 to shaft 18. The other end of spring biasing means 20 is attached by any means such as a screw (not shown) to side 12 of housing 10. Mounted below the feed means is a set of secondary shear blades 22 which is radially attached to a horizontally mounted secondary shaft 23 and journaled in the sides of housing 10. The secondary blades 22 are adapted to intermesh between the blades of the main shredding assembly 15.

A main feed conveyor 25 is mounted under normal operating conditions substantially horizontal with the shredding machine and feeds into the opening of housing 10. The main feed conveyor comprises a sprocket-drive assembly 26 which drives a pair of chains 27 and 27′ which have a plurality of horizontal bars 28 perpendicularly attached therebetween. Underneath the horizontal bars 28 and chains 27 and 27′ is a bottom 30 made of sheet metal or other suitable material. On the opposite end from drive assembly 26 is an idler sprocket 31 (see FIGURE 2). A U-shaped conveyor leg 32 is mounted at the end of feed conveyor 25 and pivotally attached by means of a bolt 33 or other suitable device to the conveyor supporting frame.

Power is supplied to the shredding machine through input shaft 40 which may be connected through a coupling mechanism to the output power take-off (not shown) of a tractor or any other suitable power output source, for example, an electric motor or a gasoline-driven motor. Shaft 40 is journaled in a shaft mount 41. A main drive pulley 43 is connected to shaft 40 at its end and comprises a large double pulley 44 and a small double pulley 45. Rotational power is supplied to the main shredding blade 15 through a plurality of belts 46 to a pulley 47 which is attached to a shaft 48.

The secondary rotating shear blade 22 is driven by power supplied from small pulley 45 through a belt 50 to a pulley 51 which is journaled through a shaft 52, and to gear reduction box 53. Gear reduction box 53 is adapted to reverse the direction of shaft 52 at its output. The output from gear reduction means 53 is applied through a shaft 54 (see FIGURE 2) to a sprocket drive wheel 55. A chain drive 56 is coupled to a second pair of sprocket drive wheels 57 and 58 which is journaled on the conveyor drive shaft 59. A second chain drive 38 is coupled to another sprocket drive 39 which is coupled to the secondary rotating blade shaft 23.

At this point it should be noted that the direction of rotation of shaft 40 is such that the large shredder blade will rotate in the direction of the arrow 102. Since the gear reduction box 53 reverses the direction of shaft 54, the secondary shredder blade 22 will rotate in the opposite direction from main shredder blade 15.

Mounted below the shredder blade is a hay removal conveyor generally referred to as 60 and includes a shoot 68. The conveyor is of the standard type driven by a pair of sprocket wheels such as a sprocket wheel 61 which is connected to a driveshaft 62. Chains 63 and 63′ are engaged in sprocket wheel 61. A plurality of horizontal bars 64 are connected between the chains 63 and 63′ and provide an engaging surface to remove the hay. A bottom 65 is mounted below the horizontal bars 64 and between chains 63 and 63′. In order to change the direction of the conveyor from horizontal to a partially vertical direction so that the hay will go up shoot 68, a bearing surface 69 is provided which may be made of heavy plastic, or oak wood, or a rotating bearing or other suitable form. A roller bar 70 is mounted below bearing surface 69 and provides the method of changing direction for the return portion of the conveyor. At the top of shoot 68 is a pair of idling sprocket wheels (not shown) which is mounted and function in the usual manner. The hay removal conveyor is driven off pulley 45 through a belt 80 which passes over a set of direction changing pulleys 81 and around a pulley 82. A shaft 83 is connected to a chain drive sprocket 84. A chain 85 is connected through a sprocket wheel 86 to shaft 62 which causes the hay removal conveyor 60 to operate. An idler sprocket wheel 87 provides a method for tightening the chain driven when replacement of the belt 80 becomes necessary.

*Mechanical operation*

The shredding machine mechanically operates as follows. Rotation of shaft 40, rotating in the direction of the arrow, rotates pulleys 44 and 45 which are rigidly attached thereto. Rotation of pulleys 44 and 47 through belt 46 causes pulley 47 to rotate in the same direction, causing shaft 48 and main shredder blade 15 to rotate. Shaft 40 also causes pulley 43 to rotate likewise through belt 50 causing pulley 51 to rotate in the same direction. It is noted here that a speed reduction is obtained by the difference in sizes between pulley 45 and pulley 51. Shaft 52 which is connected to pulley 51 operates a gear reduction box 53. Gear reduction box 53 provides approximately a 5:1 step-down in speed between shaft 52 and shaft 55. It likewise causes a change in direction of shaft 54 with respect to shaft 52. The change in direction is needed if the proper rotation of the remaining portions of the mechanism is to be obtained. Rotation of shaft 54 causes shaft 59 to rotate resulting in the chains 27 and 27′ of conveyor mechanism 25 moving toward blades 15. Since shaft 23 is connected through chain 60 to shaft 59, shaft 23 will likewise rotate in the same direction as shaft 59. This causes the secondary shear blades 22 to rotate in the opposite direction from the main shredder blade 15. In order to move the conveyor 60 up the shoot 68 so that hay falling thereon will be deposited out of its outlet, pulley 43 is connected through belt 80 to driveshaft 83. Chain 85 connects shaft 83 to shaft 62 which drives the conveyor 60. It is noted that the ratio of the pulleys driving conveyor 60 likewise are such that the conveyor is moving appreciably slower than the speed of shaft 40.

*Functional operation*

Figure 2:
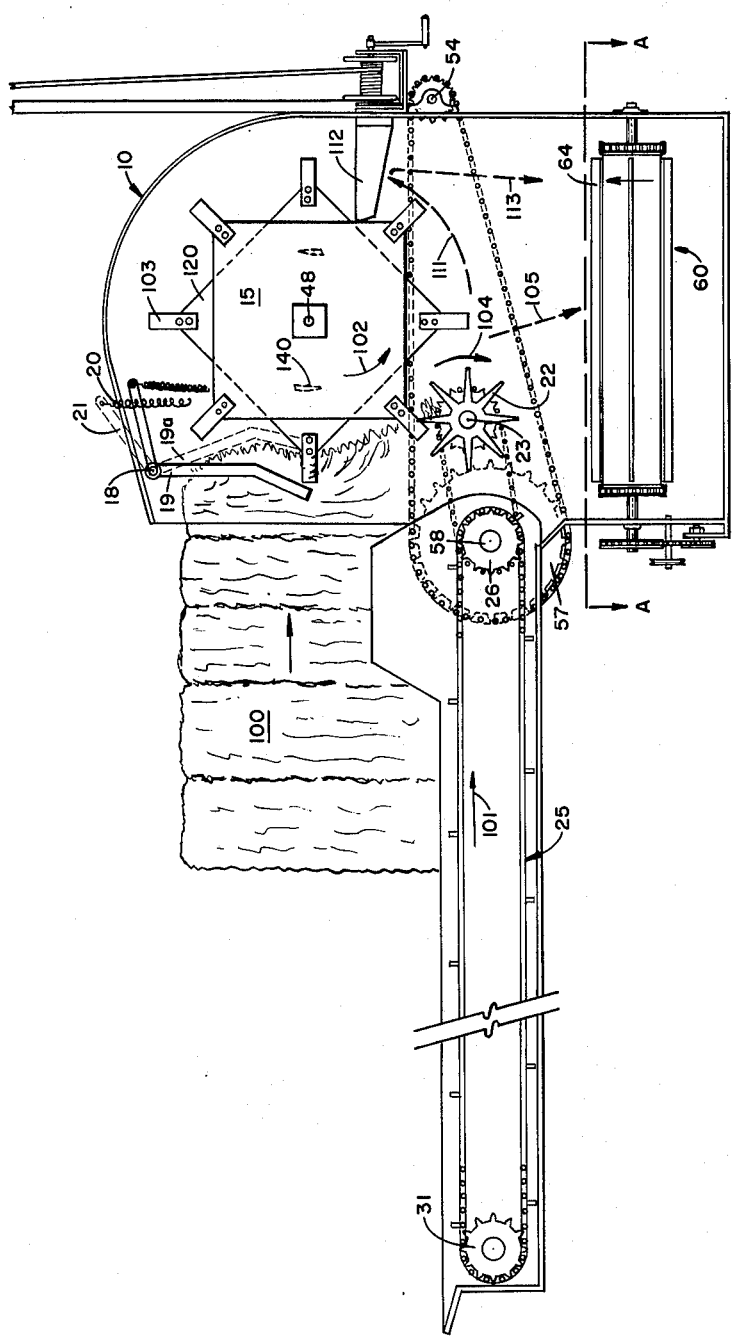
FIGURE 2 is a side view of the shredding machine taken through lines 2—2 in FIGURE 1.

The actual shredding operation can best be understood by referring to FIGURES 1 and 2, but in particular to FIGURE 2. A bale of hay 100 is placed on conveyor 25 which is moving by rotation of sprocket drive assembly 26 in the direction of arrow 101. As the hay moves forward, it strikes the angular feeder bars 19. Feeder bars 19 immediately resist the forward movement of hay bale 100 by pivoting about shaft 18 which causes lever arm 21 to rise increasing the length of spring 20 thereby increasing the spring bias and resultant pressure against the hay bale. As main shredding blade 15 rotates in the direction of arrow 102, a plurality of blades 103 strike the surface of the bale of hay 100 thereby removing a portion of the hay and bringing it down against the secondary rotating blades 22. At this point, it should be noted that secondary rotating blades 22 are operating in the direction of arrow 104. The rotational velocity of shaft 23, however, is much slower than the rotational velocity of shaft 48. Therefore, the blades 22 will shear or break the hay as the blades 103 pass between the blades 22. As the hay is broken or sheared, it falls in the direction of arrow 105 to the bottom of the shredding housing and onto conveyor 60. The parallel bars 64 pick up the hay and carry it up chute 68 and dump it from its exit 110. Any hay that remains stuck or adhering to the blade 103 is carried on around in the direction of arrow 111 until the hay strikes a set of horizontal stationary teeth 112 rigidly attached horizontally to the back of housing 10. As blades 103 rotate between the stationary shear blades 112, the hay is further shredded and the remaining broken hay then dropped in the direction of arrow 113 to the conveyor 60. If the shredding machine is desired to be used in a feed mill where portable operation would not be adventageous, the lower portion of the shredder at lines A—A may be removed and the shredding machine placed directly over a hopper or hammer mill or other suitable receiving mechanism. Thus, the hay, instead of falling onto conveyor 60, would fall in the direction of arrow 105 directly into a hammer mill or directly into a hopper or conveyor. While conveyor 60 is shown to be a mechanical chain-driven conveyor, it is obvious that it may likewise consist of an air stream or screw-type conveyor or other type conveyor well known to those skilled in the art.

Feed mechanism operation

As the bale of hay 100 moves in the direction of arrow 101, it will strike the feed mechanism shown in the rest position in solid lines. During the shredding process, the feed mechanism provides two important functions. First, as the hay moves forward it engages the angular member 19 which is attached to shaft 18. Engaging the angular member 19 causes the bias from spring 20 to increase the pressure against the bale of hay thereby preventing it from moving too rapidly into the shredding machine. Second, the angular portion 19a on feeder bars 19 controls the rate at which the hay is shredded from the bale and assists in maintaining the loose hay from falling down into the machine and jamming the operation. Thus, the feeder mechanism insures an even smooth flow of hay into the shredding operation and insures a clean and rapid shredding of the hay. The rate of feed of the conveyor 25 and shredding speed of blades 15 and 22 is generally adjusted so that the machine will shred a layer of hay at a time. It has been found through practical experience that the location of shaft 18 is preferred to be directly above the blade 103 in the horizontal position. However, relocation of shaft 18 either in front or behind this point will not render the device inoperable but will result in the machine operating with slightly less efficiency. It has also been discovered that the angle between 19 and 19a for the most efficient operation, is critical, that is, the angle between 19 and 19a was found to operate most efficiently when it was angled at 20°±5°. However, other angles have been used and the machine operated satisfactorily though not quite as efficient as the angle above specified.

Operation of the secondary shear blade

Referring to FIGURE 1, FIGURE 2 and FIGURE 3, it can be seen that the secondary shear blade 22 consists principally of a shaft 23 with a plurality of spike-like blades 22 attached radially to the periphery of shaft 23. The spike-like shearing surfaces are mounted in a common plane perpendicular to the rotational axis of the shaft 23 and spaced along shaft 23 such that each of the shearing surfaces falls between one of the plates 120 on the main shredding blade 15, for example, the plurality of shearing surfaces 22 on shaft 23 will fall intermediate between each of the plates 120 on shaft 48. It should be noted that there must be sufficient number of the shearing blades 22, mounted about shaft 23 so that regardless of the rotational position of shaft 23, a shearing surface will always be presented when a blade 103 on the main shredder blade 15 is in position to shear a portion of a bale of hay. In the preferred embodiment, eight shearing blades are used, however, it is conceivable that fewer or more than this number of blades could be used. As previously explained, the shearing blades 22 rotate at a slower speed than the shearing blades 103. This, of course, provides at any instant a shearing surface which is substantially stationary with respect to the rotation of blades 103. The speed, however, of shaft 23 must be sufficient to provide adequate cleaning of the blades for each rotation since the rotation of the blades is the primary means for preventing jamming of the shredding machine for high rates of feed. When shaft 23 was rotating at from 8 to 10 r.p.m. and shaft 15 was rotating at 1300 r.p.m. it was possible to shred as many as eight bales of hay per minute without any jamming of the machine mechanism.

FIGURE 3 shows the comparative relationship between the stationary blades 112, the rotating blades 15 and the secondary rotating blades 22 along with the feeding mechanism 19.

Figures 4, 5:
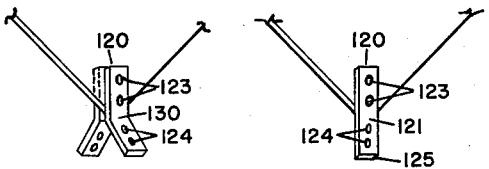
FIGURES 4 and 5 show various types of cutting or breaking blades mounted on the main shredding blade.

Referring to FIGURE 4 and FIGURE 5, two types of blades are shown which work satisfactorily on the shredding machine. FIGURE 5 is a simple, standard blade that operates satisfactorily for most shredding operations. The blade essentially comprises a flat piece of metal 121 which is attached to plate 120 by a plurality of screws 123. It should be noted that there are additional holes 124 provided in blade 121 so that when the edge 125 becomes dull, the blade may be either turned 180° or the faces interchanged, thus the blade in actual use has four usable shredding surfaces before the blade must be discarded and a new blade inserted.

FIGURE 4 shows an improved type blade 130 which is bent at an angle away from the rotational plane of blade 122. Since the blades are angled away from the rotational plane of plate 120, two blades can be mounted on the plate, thus increasing the cutting or breaking surface that may be attacked by main shredding blade 15. It is obvious, of course, that adding additional blades will increase the horsepower required to drive the unit. In order to reduce the horsepower, however, it was found that nickel plating the blades drastically reduced the cutting friction of the blades against the hay as it was being shredded.

Shredding round bales of hay

The angled blades 130 were found to provide a much improved system for slicing round bales of hay since the round bales of hay are not placed in layers such as the flat bales of hay but are wrapped circularly and injected into the baling machine end-wise. With this type bale construction, the shredding operation does not lift off layers of hay as it cuts, but must slice through the hay in the most difficult manner possible. Under these conditions, the hay had a tendency to stick together and the blades, rather than shredding the hay, channel into the hay and the hay bale itself remained substantially intact. In order to provide a machine that could also shred round bales of hay, a plurality of blades 140 were added between each of the plates 120. Blades 140 are mounted perpendicularly between each plate 120 in the main shredder blade assembly 15. They are also mounted in the direction of rotation such that as they come down against a circular bale of hay, the hay will be shredded and broken thereby permitting the remaining blades to break the hay thus loosened. The addition of this set of blades resulted in a round bale of hay becoming as nearly as easily shredded as a square bale of hay.

*Disengaging mechanism operation*

It often becomes necessary during the shredding of a bale of hay to instantly stop the shredding mechanism. Either sufficient hay has been shredded, or a foreign object has been baled in the bale of hay and continued shredding would result in damage to the machine.

Figure 7:
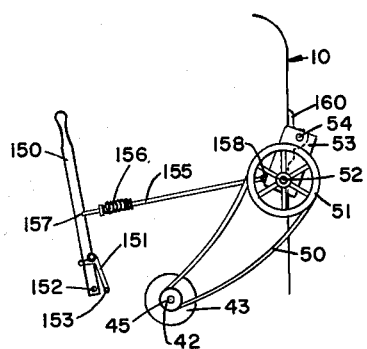
FIGURES 7 and 8 show the operation of the feeder conveyor disengaging mechanism.
Figure 8:
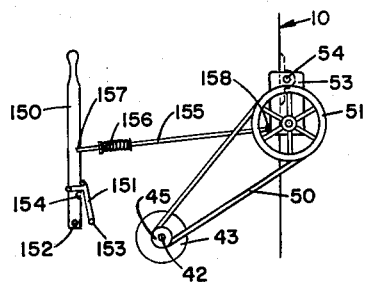

Referring to FIGURE 7 and FIGURE 8, the feed disengaging means is illustrated. Speed reducing device 53 has the output shaft 54 journaled in a pillow box 160. The input pulley 51 which is attached to input shaft 52 of the speed reducing mechanism is coupled by a belt 50 to the pulley 45. It is noted that the input shaft 52 is not axially aligned with the output shaft 54. A disengaging lever arm 50 is attached by any suitable pivot 52 to the frame 10 of the shredding machine. A coupling rod 155 is pivotally attached to the speed control box 53 at 158 and pivotally attached at 157 to a disengaging lever arm 150. The coupling rod 155 may include a spring tensioning member 156 which is axially aligned with the coupling rod 155. A locking mechanism for the system comprises a dog 151, a notch 154 in lever arm 150. Dog 151 is pivotally attached to the frame 10 by any accepted means such as a bolt 153. During the normal operation (see FIGURE 8) a dog 151 is out of notch 154 letting arm 157 be free. Spring tensioning means 156 applies bias against gear reduction box 53 by an amount sufficient to tighten belt 50. Rotation of pulley 45 is then transferred to pulley 51 through the belt 50. However, when it is necessary to disengage the conveyor mechanism and the rotating secondary blade, all that is necessary is that lever arm 150 be pulled in a direction which is away from shaft 54. This movement will cause the speed reducing box 53 to rotate about its output shaft 154. When lever 150 is pulled sufficiently far, dog 151 will drop into notch 154 locking the lever. When the speed reducing mechanism is pulled in the direction of the handle 150, the distance between the rotational axis of shaft 42 and shaft 52 has been shortened, thereby causing belt 50 to become slack. Since belt 50 is of the V-belt type drive, any slacking of the belt will cause insufficient transfer of torque from the pulleys to the belt thus disengaging the drive mechanism from the conveyor and the secondary rotating blades.

Figure 6:
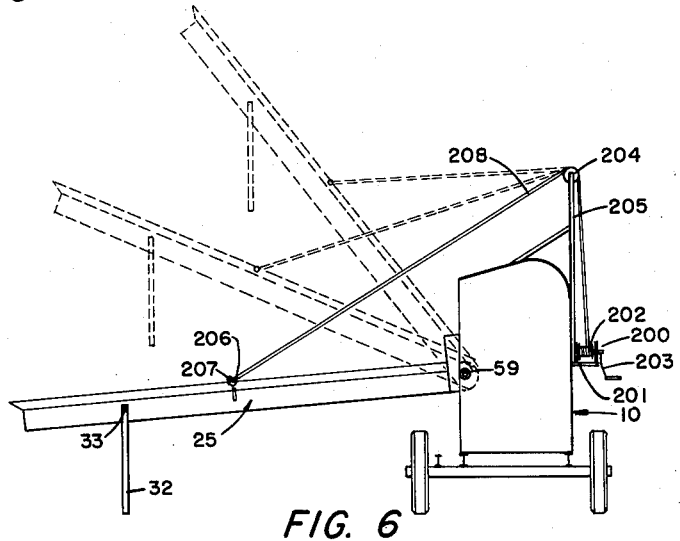
FIGURE 6 shows the operation of the hoist on the main feeder conveyor.

FIGURE 6 discloses a method for making the hay shredder readily portable. A winch 200 attached by means of a frame 201 to shredder housing 10 includes a reel 202 and a handle 203. A pulley 204 is attached by a suitable support 205 to the side of the housing. The feed conveyor housing 25 has a ring 206 adapted to receive a hook 207 which is connected through a rope 208 to reel 202. However, when the shredding machine is to be transported on a highway, the rope 208 is unreeled and hook 207 engaged into ring 208. Winch 200 is then operated by turning crank 203, reeling hope 208 on reel 202. As the rope shortens, the feed conveyor will be raised, pivoting about shaft 59 which is journaled in housing 10. The feed conveyor can be raised to nearly a perpendicular position. Leg 32 being pivoted about point 33 will maintain a substantially perpendicular attitude thereby collapsing against the bottom of the feed conveyor 25. When the shredder is in operation, hook 207 is disengaged from ring 206 and rope 208 is wound up onto reel 202. This system appreciably narrows the portable hay shredder and markedly increases its horizontal stability since the pendulous weight of the feed conveyor is no longer at the side of the shredding machine.

While miscellaneous well known expedients such as devices for tightening chain drives and belt drives have not been shown in the drawing, it is obvious to those skilled in the art that such devices would normally be employed in order to make the machine service worthy. It is further obvious that where the machine is not desired to be portable, the conveyor 60 and its associated drive mechanism would naturally be eliminated.

Thus, a hay shredder has been disclosed that has precise control over the feed and the shredding operation of the hay. A device has further been disclosed that has many features that eliminate the jamming normally associated with hay shredding machines. This hay shredding machine also discloses a method for disengaging the feed mechanism should it become necessary when foreign bodies or other objects are discovered during the shredding process or when sufficient shredding has been performed. Further, a portable hay shredding machine has been clearly disclosed with means for making the shredding machine easily transportable on roads or highways.

Although this invention has been described with respect to particular embodiments thereof, it is not to be so limited, as changes and modifications may be made therein which are within the spirit and scope of the invention as defined by the appended claims.

I claim:
1. A rotating blade for a bale shredding machine, comprising:
 (a) a shaft;
 (b) a plurality of plates each being rigidly and symmetrically attached, perpendicular to the axis, of said shaft and in spaced relation along said shaft;
 (c) a first shredding means attached to the periphery of said plates and extending substantially radially from the axis of said shaft;
 (d) a second shredding means attached between and to the interfaces of two adjacent plates and intermediate between the periphery and the mounting location of said plates, said second shredding means substantially perpendicular to a radian extending from said shaft and having its cutting edge extending in the direction of rotation of said shaft.

2. A rotating slicing blade for a bale shredding machine comprising:
 (a) a shaft;
 (b) a plurality of blade holding means rigidly mounted perpendicular to the axis of said shaft in spaced relation along said shaft;
 (c) a plurality of pairs of teeth each having a cutting portion and a mounting portion, the mounting portion of said teeth attached to an outer edge of said blade holding means, and the cutting portion of said teeth angled away from the rotational plane formed by said blade holding means;
 (d) a second set of shredding blades mounted substantially perpendicular between each of said blade holding means intermediate between the edge of said blade holding means and the shaft.

3. A bale shredding machine comprising:
 (a) a housing having an inlet opening;
 (b) a main rotatable shredder blade assembly mounted within said housing and adapted to be rotated across said opening;
 (c) a conveyor means for moving a bale of hay into said inlet opening, said conveyor means terminating at the lower portion of said opening;
 (d) a secondary rotating blade assembly mounted across the lower portion of said opening at the termination of said conveying means;
 (e) means for rotating said main rotatable shredder blade assembly; and
 (f) means for rotating said secondary rotating blade assembly in a direction opposite to said main rotating blade assembly and in a direction to pull the bale of hay into engagement with said main shredder blade assembly, the blades of said main shredder blade assembly and said secondary rotating blade assembly cooperating to form a scissor therebetween, and wherein the peripheral speed of said main shredder blade assembly is substantially greater than the peripheral speed of said secondary rotating blade assembly; and (g) an outlet means below said main shredder blade assembly which communicates with a discharge outlet for said shredded hay whereby hay fed into the opening by said feed conveyor mechanism is caught between said rotating blade and secondary shredder blade and broken or cut and discharged out of said shredding machine through said outlet;

(h) a feed mechanism shaft pivotally mounted across the top of said opening and having means attached to said feed mechanism shaft which extends across said opening and adapted to engage a bale of hay passing into said opening, said feed mechanism including a biasing means adapted to exert a retarding force against said bale of hay as it approaches said main shredder blade assembly, and further adapted to hold loose hay against the engaging end of said hay bale thereby preventing said loose hay from falling into said shredding blade assembly.

4. In a bale shredder having a housing comprising a top and sides and an opening through one of said sides, and additionally including a bale shredding assembly horizontally mounted across said opening, an improvement comprising a feed mechanism which includes, (a) a shaft horizontally mounted across the top of said opening;

(b) a plurality of parallelly spaced bar members attached at one end to said horizontal shaft, said bar members being angled at the unattached end away from the shredding assembly; and (c) biasing means attached to said horizontal shaft, said biasing means adapted to urge said parallelly spaced bar members away from said shredder assembly.

5. In a hay shredding machine having a plurality of rotating cutting blades and a plurality of striker blades cooperating therewith, an improvement comprising: a bale feed control mechanism having, (a) an elongated shaft;

(b) means for rotatably mounting said elongated shaft axially parallel with and above the rotational axis of said rotating cutting blades;

(c) a plurality of feeder control bars attached at one end to the periphery of said shaft, said feeder bars spaced to extend downwardly between said plurality of rotating blades; and (d) spring biasing means adapted to urge said feeder bars away from the rotational axis of said rotating blades.

6. A bale shredding machine comprising: a housing having an inlet opening and an outlet opening, a main rotatable shredder blade assembly mounted within said housing and adapted to be rotated across said inlet opening, a hay conveying means mounted to said housing and terminating at the inlet opening of said housing, a secondary rotating blade assembly journaled in said housing and mounted across the lower portion of said inlet opening and at the termination of said hay conveying means, a first means for rotating said main rotatable shredder blade assembly in a direction to shred the hay from the top of said bale to the bottom of said bale, a second means for operating said hay conveying means and said secondary rotating blade assembly, said secondary blade assembly rotating in a direction opposite to that of said main shredder blade assembly, a discharge conveyor means journaled in said housing and mounted across the outlet opening of said housing and adapted to convey the shredded hay from the outlet opening of said housing, a third means for operating said discharge conveyor means, motor means connected to said first, second and third means and disengaging means connected between said motor means and said second means whereby operation of said disengaging means stops the operation of said secondary rotating blade assembly and said hay conveying means whereby additional hay will not be fed into said shredding means but hay thus fed in will continue to be shredded and conveyed out of said machine.

7. A disengaging device as described in claim 6 and comprising a gear reduction means having an input and output shaft, said output shaft journaled on said housing and connected to said second means, means connecting said input shaft to said motor means, an operating lever pivotally attached to said housing at one end, a control rod attached to said lever and to said gear box whereby operation of said lever means causes said control rod to rotate said gear box about its output shaft causing the means coupling said input shaft to said motor means to disengage.

References Cited by the Examiner

UNITED STATES PATENTS

| | | | |
|---|---|---|---|
| 832,872 | 10/06 | Mitchell | 146—117 |
| 2,244,362 | 6/41 | Holland-Letz | 198—204 |
| 2,281,846 | 5/42 | Klein | 146—119 |
| 2,301,088 | 11/42 | Stahl | 198—167 |
| 2,681,090 | 6/54 | Hicks et al. | 146—70.1 |
| 2,685,900 | 8/54 | Cross. | |
| 3,005,637 | 10/61 | Hetteen. | |
| 3,039,505 | 6/62 | Mast. | |

J. SPENCER OVERHOLSER, *Primary Examiner.*